United States Patent [19]

Schuldt

[11] Patent Number: 4,611,298

[45] Date of Patent: Sep. 9, 1986

[54] INFORMATION STORAGE AND RETRIEVAL SYSTEM AND METHOD

[75] Inventor: Marlo E. Schuldt, Orem, Utah

[73] Assignee: Harding and Harris Behavioral Research, Inc., Pleasant Grove, Utah

[21] Appl. No.: 501,011

[22] Filed: Jun. 3, 1983

[51] Int. Cl.$^4$ .............................................. G06F 15/40
[52] U.S. Cl. .................................................. 364/900
[58] Field of Search ... 364/200 MS File, 900 MS File, 364/300

[56] References Cited

U.S. PATENT DOCUMENTS 4,318,184  3/1982  Millett et al. ........................ 364/900
4,468,728  8/1984  Wang ................................... 364/200

Primary Examiner—Raulfe B. Zache
Attorney, Agent, or Firm—Workman, Nydegger & Jensen

[57] ABSTRACT

A computer system for electronically storing and retrieving data files which have been linked together to form a hierarchal information tree having a plurality of mutually exclusive branches corresponding to the information represented by the data files and which has been classified at various levels in the hierarchal structure of the tree. The computer system has a central processing unit that is electronically coupled to input/output apparatus which includes a keyboard, a CRT screen, a printer and, if desired, an analog/digital input device. An electronic storage means is electronically coupled to the CPU. The storage means contains a system control program together with the data base of files linked together to form the expandable hierarchal tree. A separate portion of the storage means, or a second storage device also contains a system control program together with addressable files which may be used to store information which is retrieved as the CPU searches the data base.

11 Claims, 24 Drawing Figures

```
A2            DEFECTIVE SPEECH

SPEECH SOUNDS ARE INCORRECTLY PRODUCED
OR OMITTED.

1. INCORRECT SOUND PRODUCTION.

2. LISPING: MISARTICULATED SIBILANTS.
    /S/ AND /Z/ SOUNDS ARE MOST COM-
    MONLY LISPED.   (LATERAL LISP,
    FRONTAL LISP, AND NASAL LISP).

3. ORGANIC SPEECH DISORDERS RESULTING
    FROM MALFORMATION, DAMAGE OR DIS-
    EASE TO MUSCLES, AND BRAIN CENTERS
    CONTROLLING SPEECH PRODUCTION.
    (TONGUE TIE, DYSARTHRIA, APRAXIA).

/ / /         PRESS RETURN          \ \ \
 ------------------------------------------
 4. FUNCTIONAL SPEECH DISORDERS RESULT-
    ING FROM EMOTIONAL, ENVIRONMENTAL,
    AND LEARNED SITUATIONS. (EMOTIONAL,
    ENVIRONMENTAL, AND TONGUE THRUST).

5. REVERSE

6. FORWARD
 ENTER NUMBER AND PRESS RETURN.
```

Fig. 7

```
A2B                    LISPING

SUBSTITUTION AND/OR DISTORTION OF
SIBILANT SOUNDS. (S,Z,SH,CH,SH).

1. LATERAL LISP:  TONGUE TIP MAKES
     SUSTAINED CONTACT WITH FRONT TEETH
     OR ALVEOLAR RIDGE. AIR MOVES
     AROUND THE SIDES OF THE TONGUE RE-
     SULTING IN A "SLUSHY" SOUND. SOUNDS
     MUCH LIKE A VOICELESS /L/ SOUND.

2. FRONTAL LISP:  TONGUE PLACED IN-
     APPROPRIATELY BETWEEN FRONT TEETH
     DURING SPEECH.

/ / /            PRESS RETURN             \ \ \
  -------------------------------------------------
  3. NASAL LISP:  A NASAL QUALITY IS
     ADDED TO NON-NASAL SOUNDS. NASAL
     FRICTION OR EMISSION IS COMMON ON
     THE /S/ AND /S/ SOUNDS.

4. REVERSE

5. FORWARD

ENTER A NUMBER AND PRESS RETURN.
```

Fig. 8

```
A2BI                LATERAL LISP

DIAGNOSIS

DISTORTED SPEECH SOUNDS AND INAPPROPR-
IATE USE OF TONGUE.

A. TONGUE TIP MAKES SUSTAINED CONTACT
     WITH FRONT TEETH OR ALVEOLAR RIDGE.
  B. AIR MOVES AROUND THE SIDES OF THE
     TONGUE RESULTING IN A "SLUSHY"
     SOUND. SOUNDS MUCH LIKE A VOICELESS
     /L/ SOUND.
  C. TONGUE MAY HANG OVER LOWER MOLARS
     DURING SPEECH.

ENTER
/Q  QUESTION   /S  SYMPTOM   3. BIBLIOGRAPHY
 1. CAUSE ASSOC. FACT.       4. REVERSE
 2. TREATMENT                5. FORWARD
```

Fig. 9

```
A2B1-C              LISPING

CAUSE(S) AND/OR ASSOC. FACTORS:

A2D3  TONGUE THRUST
    J   DENTAL OCCLUSION
    J   CLEFT PALATE
    V   VELOPHARYNGEAL FUNCTION
    V   NASALITY
    V   ENLARGED ADENOIDS REMOVED

H2  OTITIS MEDIA

1. DIAGNOSIS        4. REVERSE
2. TREATMENT        5. FORWARD
3. BIBLIOGRAPHY
```

Fig. 10

```
A2B1-T              LATERAL LISP

TREATMENT RECOMMENDATION:

CLINICIANS REPORT A LESS THAN OPTIMIS-
TIC PROGNOSIS FOR LATERAL LISP. IN THE
OPINION OF THIS CLINICIAN, TREATMENT
SHOULD BE INITIATED EARLY TO REDUCE THE
HABIT STRENGTH OF INCORRECT TONGUE
PLACEMENT. AN OLDER CHILD MAY UNDER-
STAND BETTER BUT HABITS MAY BE HARDER
TO CHANGE AT A LATER DATE.
     FIRST REMOVE ALL OTHER EASIER
ARTICULATION PROBLEMS SO THAT FULL AT-
TENTION CAN BE GIVEN TO THE LISP AT A
LATER DATE.  RAPID SUCCESS WILL IN-
CREASE THE CHILD'S MOTIVATION. AUDITORY
DISCRIMINATION WILL ALSO IMPROVE AS
SUCCESS IS EXPERIENCED WITH THE COR-
RECTION OF EASY SPEECH SOUNDS. CONT. NEXT
PAGE.
```

Fig. 11

```
TC          INDIVIDUAL CLIENT FILE #1

DIAGNOSTIC SCREENING EVALUATION FOR
            COMMUNICATIVE DISORDERS

TABLE OF CONTENTS
TOPIC                            INDEX NUMBER

CLIENT DATA (NAME, AGE ETC.) . . . CD

DIAGNOSTIC SECTION

SYMPTOM SUMMARY . . . . . . . . . SS
   QUESTION SUMMARY. . . . . . . . . QS
   PROGRESS SUMMARY. . . . . . . . . PS
   INITIAL EVALUATION SUMMARY-RECOM  ISR
   THERAPY GOALS NOT ACHIEVED. . . . TGN
   THERAPY PROBLEMS  . . . . . . . . TP

- - - PRESS RETURN TO CONTINUE - - -
-------------------------------------------
TEST RESULTS
   ARTICULATION  . . . . . . . . . . TR-A
   VOCABULARY  . . . . . . . . . . . TR-V
   LANGUAGE  . . . . . . . . . . . . TR-L
   AUDITORY  . . . . . . . . . . . . TR-AD
   PROCESSING  . . . . . . . . . . . TR-PS
   OTHER . . . . . . . . . . . . . . TR-O

THERAPY FOCUS AREAS / GOALS ACHIEVED
   ARTICULATION  . . . . . . . . . . TFA-A
   LANGUAGE  . . . . . . . . . . . . TFA-L
   VOCABULARY  . . . . . . . . . . . TFA-V
   AUDITORY  . . . . . . . . . . . . TFA-AD
   PROCESSING  . . . . . . . . . . . TFA-PS
   BEHAVIOR  . . . . . . . . . . . . TFA-BH
   OTHER . . . . . . . . . . . . . . TFA-O
```

Fig. 12

```
TR-A       ARTICULATION TESTING

NOTATION:  DISTORTION    ENTER NUMBER 1-3
           SUBSTITUTION  ENTER LETTER
           OMISSION      ENTER -

VOWEL SOUNDS
                      TEST DATE <00/00/00>

ERROR                ERROR
LONG  E (EAT)   < >   LONG  O  (OAT)  < >
SHORT I (SIT)   < >   SHORT OO (PUT)  < >
LONG  A (CAKE)  < >   LONG  OO (MOO)  < >
SHORT E (SET)   < >   LONG  I  (ICE)  < >
SHORT A (CAT)   < >         OI (OIL)  < >
SHORT U (RUN)   < >         OW (OWL)  < >
SHORT O (HOT)   < >
COMMENTS:

PRESS RETURN FOR ARTICULATION TEST -
```

Fig. 13

INFORMATION STORAGE AND RETRIEVAL SYSTEM AND METHOD

FIELD OF THE INVENTION

The present invention relates to systems and methods of information storage and retrieval, and more particularly to a computer system for electronically storing and retrieving data files which have been linked together to form a hierarchal information tree having a plurality of mutually exclusive branches corresponding to the information represented by the data files and which has been classified at various levels in the hierarchal structure of the tree.

THE PRIOR ART

Since the inception of the computer, computer scientists have continually struggled with the problem of attempting to build computer systems which are capable of storing more data and processing the data more rapidly. The state of the art has rapidly advanced in this area. For example, it is a well-known fact that today small desk-top computers are as powerful in terms of data storage capability and processing of that data as were many of the earlier predecessor computers which were so large that they filled entire rooms.

Notwithstanding these advances, certain applications continue to require the use of data bases which are so large that the data cannot be stored and processed except by very large and expensive computer systems. A good example of the type of application in question involves the use of computer systems which are used in an attempt to provide artificial intelligence such as in the case of medical diagnostic programs, computer-aided design and manufacturing technology and other similar kinds of applications.

Efficiency of a computer system in terms of its ability to store large bodies of data and to efficiently identify and retrieve data once it has been stored is largely a function of how compactly the data is stored and the manner in which the data is linked together in order to permit retrieval. One of the most common prior art approaches to this problem has been to store data simply in the form of lists which can be separately identified and accessed by a computer system. Another common approach is to use lists which are linked together using various pointers. This approach has largely been used in an attempt to reduce to some extent redundant storage of information. The use of lists and pointers continues even today to be a very widely used approach to computer system data base organization and management.

However, there are several well-known disadvantages to these types of prior art approaches. For example, as noted in U.S. Pat. No. 4,318,184 issued Mar. 2, 1982 to Ronald P. Millett et al., retrieval times are long and manipulation of retrieved data using computer systems which are structured in this manner is relatively difficult and requires in many instances a large amount of computer time.

The present invention contemplates a computerized information storage and retrieval system for electronically storing and retrieving data files which have been linked together to form a hierarchal information tree having a plurality of mutually exclusive branches corresponding to the information represented by the data files, and which has been classified at various levels in the hierarchal structure of the tree, thus resulting in a computer information storage and retrieval system which overcomes the foregoing disadvantages of the prior state of the art and is much more efficient in terms of its ability to utilize and process data.

OBJECTS AND BRIEF SUMMARY OF THE INVENTION

It is a primary object of the present invention to provide a computerized information storage and retrieval system and method that is capable of efficiently storing and retrieving relatively large bodies of information such that the information can be efficiently stored and retrieved using a relatively small, inexpensive computer system.

Another important object of the present invention is to provide a computer system and method for electronically storing and retrieving data files which have been linked together to form a hierarchal information tree which can be easily expanded to include additional data at any time without having to restructure the classification scheme represented by the hierarchal information tree.

These and other objects and features of the present invention will become more fully apparent from the following description taken in conjunction with the drawings and claims.

In accordance with the foregoing objects, the present invention consists of a computerized system and method for electronically storing and retrieving data files which have been linked together to form a hierarchal information tree. The computer system has a central processing unit (CPU) that is electronically coupled to input/output (I/O) apparatus which includes a keyboard, a CRT screen, a printer and, if desired, an analog/digital input device. A storage medium which may be in the form of two separate disc drives is also coupled to the CPU. One of the disc drives contains a system control program together with the data base of files linked together to form an expandable hierarchal tree in which each branch of the tree corresponds to data files which have been separately classified and arranged. A unique alphanumeric address is assigned to each branch of the hierarchal information tree. Each such address identifies one or more data files which contain the information which has been classified. The data base is linked together in a way that permits additional data files to be added to the hierarchal structure of the tree either by adding added files to one or more new branches added to an existing level in the hierarchal structure of the tree, or by adding additional files which are represented by new branches in a new level added to the hierarchal structure of the tree. The CPU is used to efficiently retrieve data from the hierarchal information tree, and the retrieved data may then be stored and indexed on a separate storage medium contained in the second disc drive.

BRIEF DESCRIPTION OF THE DRAWINGS

Reference is next made to the drawings in which like parts are designated with like numerals throughout, and in which:

FIGS. 6-13 are schematic diagrams which illustrate the manner in which information may be retrieved and displayed on a CRT screen for purposes of selection, storage and subsequent retrieval of data which has been stored using the system and method of the present invention.

DETAILED DESCRIPTION OF THE PRESENTLY PREFERRED EMBODIMENT

The system and method of the present invention may be adapted to a wide variety of applications. For example, the system and method of this invention may be used as an aid in providing diagnostic information with respect to symptoms of speech or hearing disorders, including their causes and treatment, as well as other types of physiological disorders; it may be used as an aid in helping to identify and treat learning disabilities; it may be used as an aid to help identify and define corrective procedures for mechanical disorders in highly technical and complicated machines or systems; and it may be used in many other types of applications. It is therefore useful to begin with a general description of the system and method of the present invention, realizing that the principles and concepts embodied in this general description may be adapted to many different types of useful applications. The general description is followed by a detailed example illustrating the use of the system and method of the present invention in the context of the computer-aided medical diagnostics system.

Figure 1:
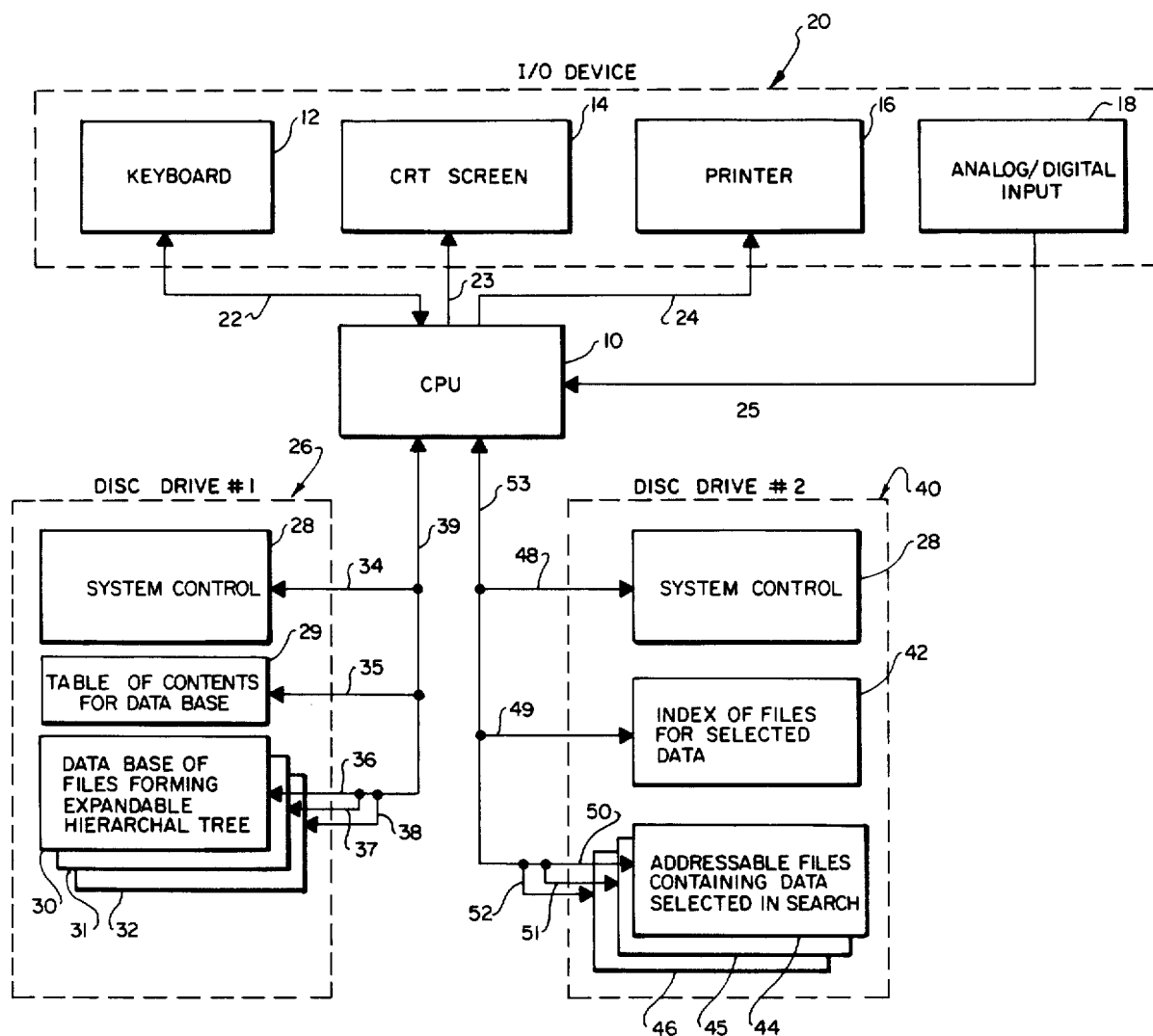
FIG. 1 is a schematic diagram which generally illustrates the computer system of the present invention.

Referring first to FIG. 1, a typical computer system which may be used to implement the method of the present invention includes a central processing unit (CPU) 10 which is electronically coupled as schematically represented by lines 22-25 to an input/output (I/O) apparatus generally designated at 20. The I/O apparatus 20 may include a conventional keyboard 12 through which an operator inputs information into the system, and a CRT screen 14 and printer 16 through which the CPU 10 may output information in response to the input data and system control program. The I/O apparatus 20 may also, if desired, include an analog/-digital (A/D) input device 18 through which information may be transformed from an analog to a digital format and then input to the CPU 10.

CPU 10 also conventionally includes a storage means which contains the system control porgram for operating the computer system and which is also used for storing the system's data base and selected data which may be retrieved from the data base and stored for future reference. Although the storage medium for the CPU 10 could be any conventional type of electronic data storage means, in the illustrated embodiment, CPU 10 is coupled to two disc drives generally designated at 26 and 40, respectively. In the alternative, the storage means could also be a hard disc divided into two portions, one of which contains the information corresponding to that contained on disc drive 26, and the other containing information corresponding to that contained on disc drive 40.

Disc drive 26 includes a system control program schematically represented at 28, and also includes a data base of files 30-32 which are linked together to form an expandable hierarchal information tree, as hereinafter more fully described, and a table of contents for the data base, as schematically indicated at 29. The first disc drive 26 is electronically coupled to the CPU 10 as schematically represented by lines 34-39 so that the CPU 10 may be instructed by the system control program 28 and so that the CPU 10 can communicate with and retrieve data from the table of contents 29 or the data base files 30-32.

The second disc drive at 40 also contains a system control program as schematically represented at 28. As hereinafter more fully described, the system control programs 28 of the two disc drives 26 and 40 are identical. The second disc drive 40 also includes a series of addressable files 44-46 which contain data that has been selected from the hierarchal information tree searched by CPU 10. An index 42 for the addressable files 44-46 is also contained on the second disc drive 40. As schematically represented by lines 48-53, CPU 10 is electronically coupled to the second disc drive 40 so as to be able to be controlled by the system control program 28 and so as to be able to communicate with the index 42 and addressable files 44-46.

Figure 2B:
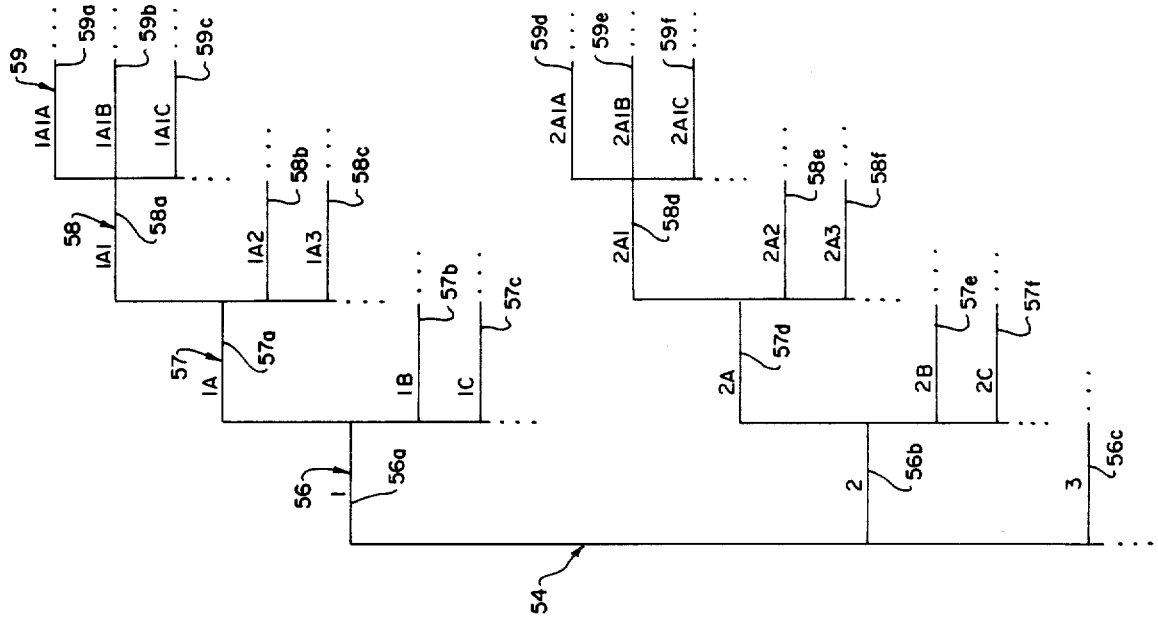
FIGS. 2B-2D are schematic diagrams generally illustrating different variations of the addressing system of FIG. 1 which may be used to link the data files of each branch together.
Figure 2A:
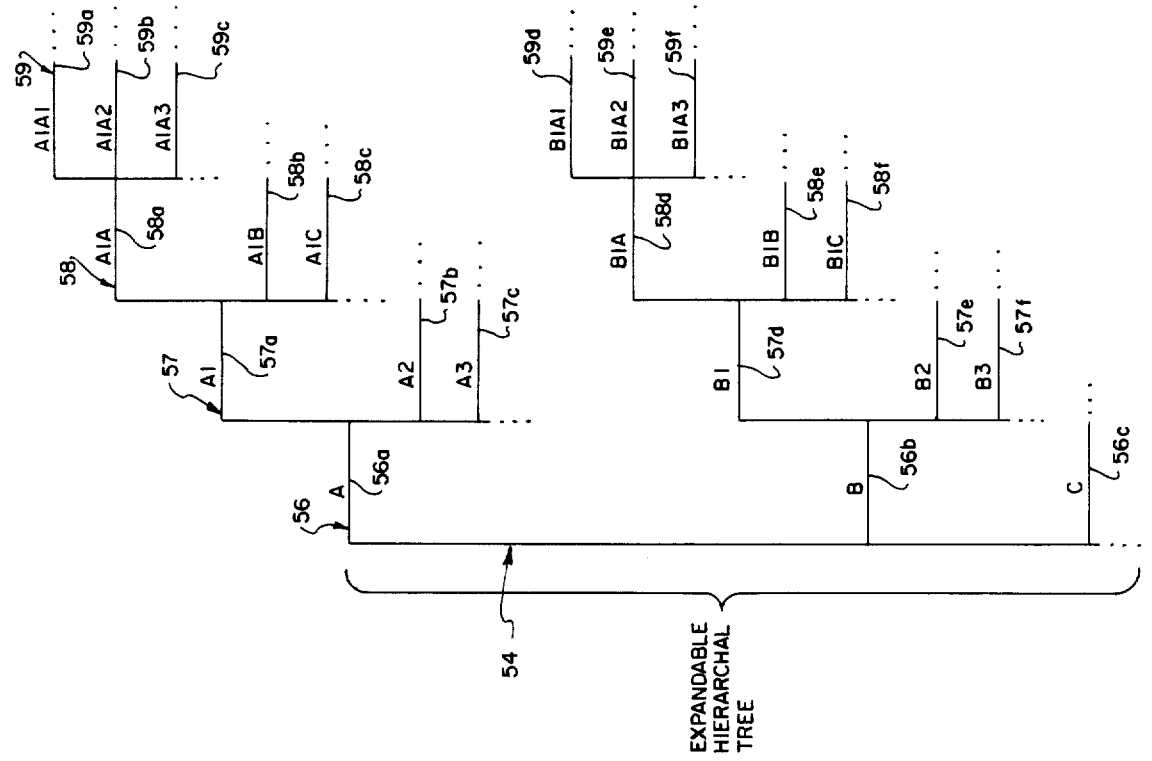
FIG. 2A is a schematic diagram which illustrates one way in which information may be classified and linked together to form an expandable hierarchal information tree in which each branch of the tree is identified by a unique alphanumeric address.

The manner in which the files 30-32 of the CPU's data base are linked together to form an expandable hierarchal information tree is generally illustrated in FIG. 2A. With reference to FIG. 2A, the diagram generally designated at 54 represents an expandable hierarchal information tree having various levels generally designated at 56-59, respectively. Each level 56-59 of the hierarchal information tree contains a plurality of mutually exclusive branches. For example, the first level 56 of the hierarchal information tree 54 is illustrated as consisting of separate branches 56a-56c and so on. The second level 57 consists of the mutually exclusive branches 57a-57f. Similarly, the third and fourth levels 58 and 59 contain branches 58a-58f and 59a-59f, respectively.

Each branch of the hierarchal information tree represents information contained in one or more of the data files 30-32 (see FIG. 1) of the CPU's data base, which is thus classified and organized. For example, if the system were being used to provide information with respect to symptoms of certain types of speech or hearing disorders, each branch of the hierarchal information tree would represent information which describes a possible symptom of a particular speech or hearing disorder. Each symptom might then be further identified by more specific information contained in the various data files which may be addressed by a unique alphanumeric address associated with each separate branch of the tree.

One method of addressing the various branches and their corresponding data files is illustrated in FIG. 2A. As shown in FIG. 2A, in the first level the branches 56a–56c are addressed by the alphabetical letters A–C, respectively, and so on. In the second level of the hierarchal information tree, the branches 57a–57c which further classify and define the information more generally represented by the preceding branch 56a are identified first by the letter "A" which corresponds to the preceding branch 56a, and then by the succeeding numerals 1–3, thus forming a unique alphanumeric address for those branches. Similarly, branches 57d–57f, which further classify and define the information generally contained in the data file for branch 56b are addressed by the alphanumeric address B1–B3, respectively.

By alternating the letters and numerals used to address the branches in each successive level of the hierarchal information tree, it is possible to link the data files together in a very efficient manner so as to form the type of hierarchal information tree schematically represented in FIG. 2A. The particular advantage of using this type of unique alphanumeric addressing system to link the data files together is that the hierarchal information tree can be expanded at virtually any part of its structure to include additional files without having to revise the existing addresses for the other files.

For example, additional files could be added to any existing level 56–59 of the hierarchal tree simply by adding additional branches which are addressed using the same sequence of letters and numerals as used to address the existing branches in that particular level. As an example, if it were desired to add another branch to the family of data files described by branches 58a–58c, the additional branches added to that family would be addressed beginning with the alphanumeric address "A1D", "A1E" and so on. Of course, it is also possible to expand the hierarchal information tree by simply adding additional levels subsequent to any branch in the tree. For example, if a new level is to be added following branch 59a, the next succeeding branch in that new level would be addressed by "A1A1A" followed by "A1A1B", and so on. Thus, it will be appreciated that the data base may be expanded at any point in the structure of the hierarchal tree by either adding additional branches to existing levels, or by adding completely new levels of branches following any existing branch in the hierarchal structure of the tree. The addition of such additional data files does not disturb the addressing system used for the other existing branches, and thus can be efficiently accomplished without having to revise the data base by merely adding the additional information to it in accordance with the existing addressing scheme.

Figure 2D:
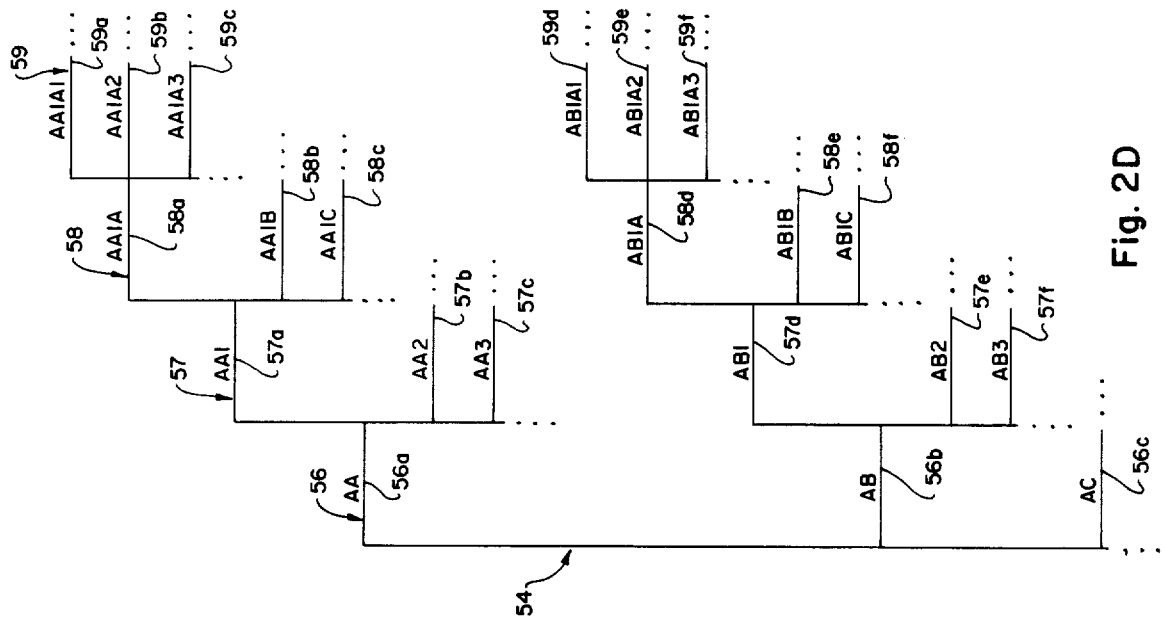
Figure 2C:
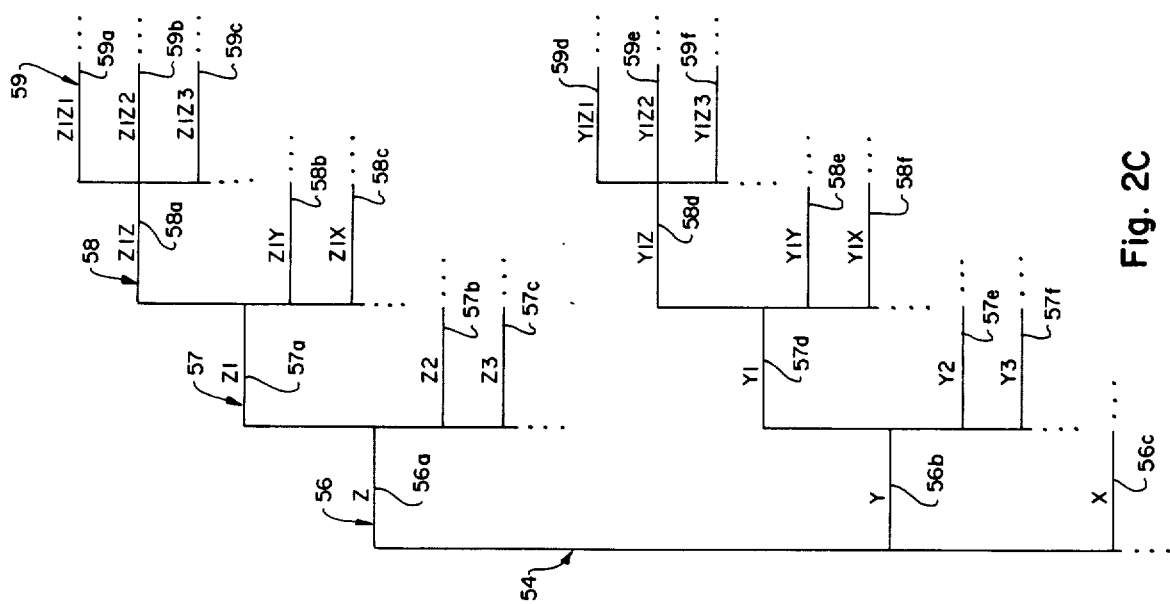

This method of addressing each separate branch in the hierarchal information tree can be achieved using many different types of alphanumeric addressing systems. FIG. 2A illustrates one presently preferred method of assigning this type of alphanumeric address to each of the branches, while FIGS. 2B–2D illustrate other equally effective ways of addressing the branches of the hierarchal information tree. Thus, it should be appreciated that the manner of addressing the branches as illustrated in FIG. 2A is merely representative of the concept that the hierarchal structure of the tree can be easily expanded to include additional data if an alphanumeric addressing system is used which alternates letters and numerals in the indicated fashion.

As mentioned in connection with FIG. 1, each of the discs in disc drives 26 and 40 which are electronically coupled to CPU 10 contain a series of instructions in the system control portion 28 which is used to instruct and operate the computer system. The instructions which are contained in the system control portion 28 of the disc are generally illustrated by the procedural flow diagrams of FIGS. 3A and 3B. It will of course be appreciated that the flow diagram of FIGS. 3A and 3B could be rearranged without departing from the substance of the operational instructions represented by those flow diagrams. Thus, FIGS. 3A–3B are intended to be merely representative of one presently preferred method of controlling the computerized information storage and retrieval system generally illustrated and described above in connection with FIG. 1.

Because the data files that form the data base for the CPU are linked together using the alphanumeric addressing system described above, the data base can be very efficiently stored and easily retrieved and searched using a small microcomputer. Thus, while the CPU 10 of FIG. 1 could be any type of main frame computer, in the presently preferred embodiment as illustrated in FIG. 1 CPU 10 may be, for example, an Apple II computer or other comparable type of microcomputer. Thus, the instructions generally represented by the flow diagram of FIGS. 3A and 3B may be written in a language that is compatible with the Apple II or other comparable types of microcomputers, or in a language that is compatible with other types of main frame or minicomputers.

Figure 3A:
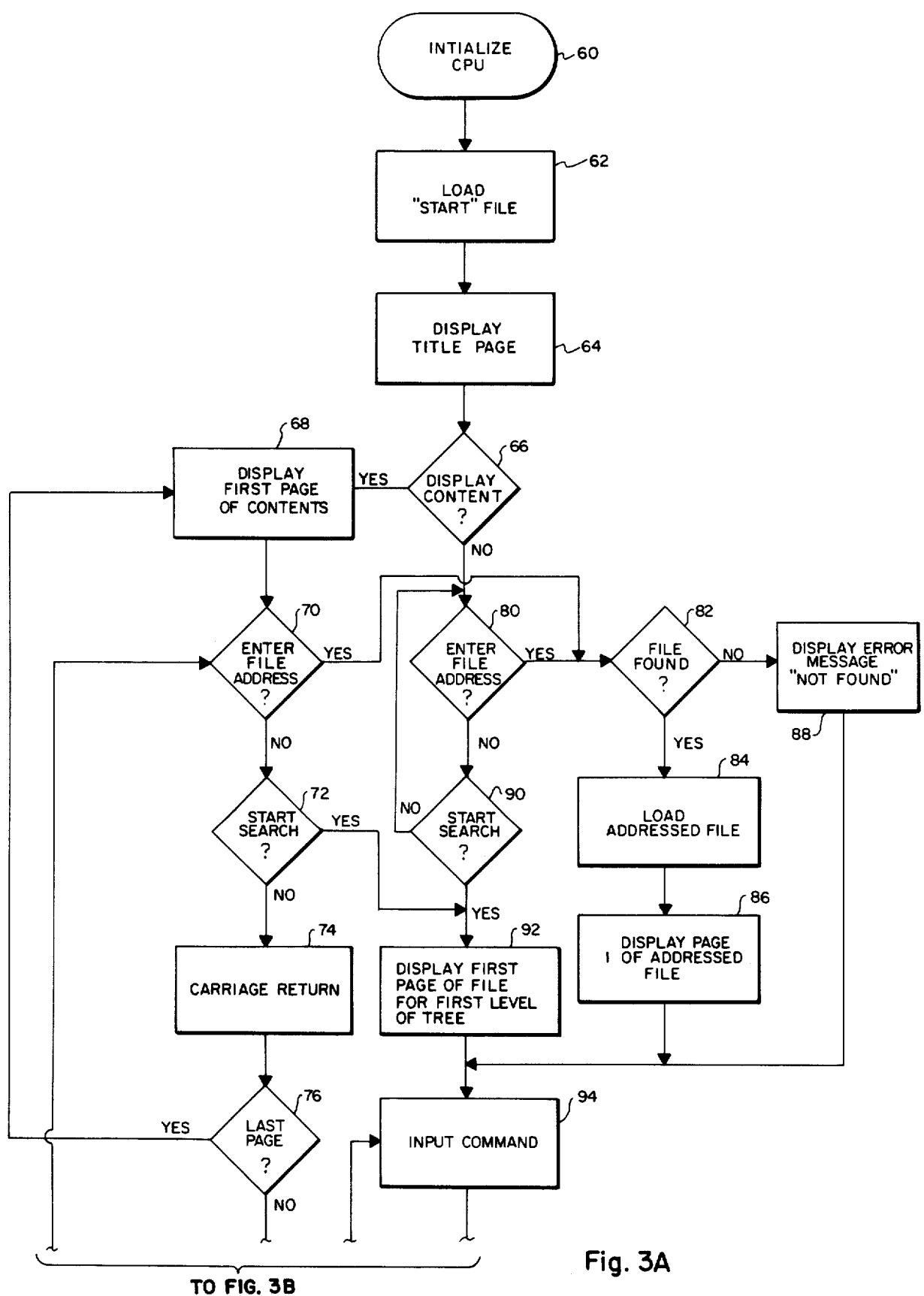
FIGS. 3A, 3B, 4A-4H schematically illustrate a flow diagram which represents one presently preferred method of retrieving information from the data files which are linked together to form the hierarchal information tree stored in the data base of the computer system.
Figure 3B:
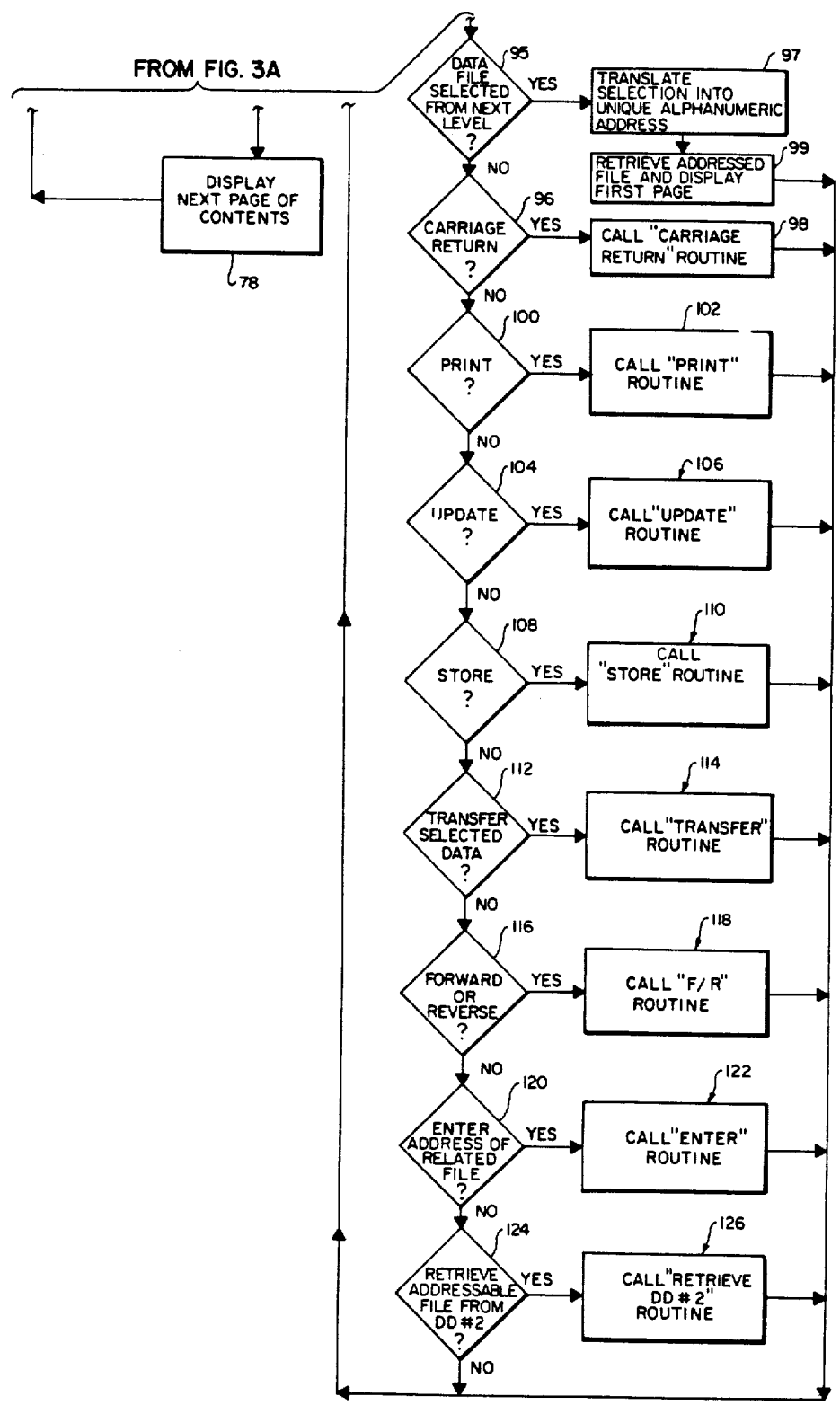

Referring first to the portion of the flow diagram illustrated in FIG. 3A, as schematically illustrated at step 60, the CPU is initialized by turning the computer system on and by loading the magnetic discs (not shown) which contain the system control instructions and data files into the disc drives 26 and 40. CPU 10 then moves to the next step 62 and automatically loads a "start" file. The start file contains the title page and table of contents for the data base. CPU 10 then moves to the next step 64 and displays the title page on the CRT screen 14. At this point, the system user has three options for retrieving information from the data base. The three options begin at steps 66, 80 or 90, respectively. The system user can review the table of contents for the data base and select one or more files directly from the table of contents. Or, since a system user may have acquired a high degree of familiarity with the information contained in the data base through frequent use of the system, the system user may already know a particular data file which he desires to retrieve and may simply directly address that file. More typically, however, a system user will not likely be able to directly address a file simply by looking at the table of contents or through his knowledge of the data base from prior use, and may thus desire to have the CPU search the hierarchal information tree in order to help him find the desired information contained in the hierarchal information tree of the data base.

If the system user is already familiar with the address of the particular data file that he wants the CPU to retrieve, he may simply enter that address and the CPU then moves to step 80. The CPU then searches in step 82 to determine whether the address which has been entered is found in the hierarchal information tree of the data base. If the file is not found, the CPU 10 displays an error message on the CRT screen 14, as represented at step 88. If the address file is found, the CPU 10 loads the addressed file and then displays the first page of that file in steps 84 and 86, respectively. CPU 10 then returns to determine at step 94 whether another command has been input to the computer system.

If the system user does not initially know the address of a particular file or files which he desires to have the CPU retrieve, he may wish to review the table of contents. In that case the CPU 10 is instructed in step 66 to display the table of contents so that the first page of the table of contents appears on the CRT screen 14, as schematically represented in step 68. If the address of a particular data file is selected from the table of contents in step 70, the CPU then moves to steps 82, 84, 86 and 88, as described previously. If the address of a data file is not selected from the first page of the table of contents, and if the CPU is not instructed to start searching the data base in step 72, the system user may enter a carriage return instruction in step 74 and the CPU will then display the next page of the table of contents in step 78, unless it has previously determined in step 76 that the last page of the table of contents has already been reached, in which case it will return the user to the first page of the table of contents. In this manner, the system user may review the entire table of contents and he may select from that table of contents the address of any file contained in the data base.

Since the table of contents only contains a very general description of the information which has been classified and linked together to form the hierarchal information tree of the data base, typically it will be necessary to search the data base in greater detail. When the CPU has been instructed in step 72 or step 90 to begin searching the data base, the CPU 10 displays the first page of information addressed at the first branch in the first level of the hierarchal information tree. For example, in the case of the hierarchal information tree generally illustrated in FIG. 2A, step 92 will result in retrieval of the corresponding information classified at branch 56a and addressed by the alphanumeric address "A". Once the first page of the data file for the first branch in the first level of the hierarchal information tree has been displayed on the CRT screen 14, CPU 10 then moves to step 94 where it looks for one of several possible input commands. At this point, the system user may enter any of the commands represented in steps 95, 96, 100, 104, 108, 112, 116, 120 or 124.

If a data file from the next level in the hierarchal tree is selected in step 95 from the information displayed on CRT screen 14, the selection is automatically translated by CPU 10 in step 97 so as to identify the unique alphanumeric address of the corresponding branch in the next level of the hierarchal information tree. This alphanumeric address can be used to retrieve the addressed data file as indicated in step 99. The first page of information is displayed on CRT screen 14, and CPU 10 then returns to step 94 to look for the next command.

Figure 4A:
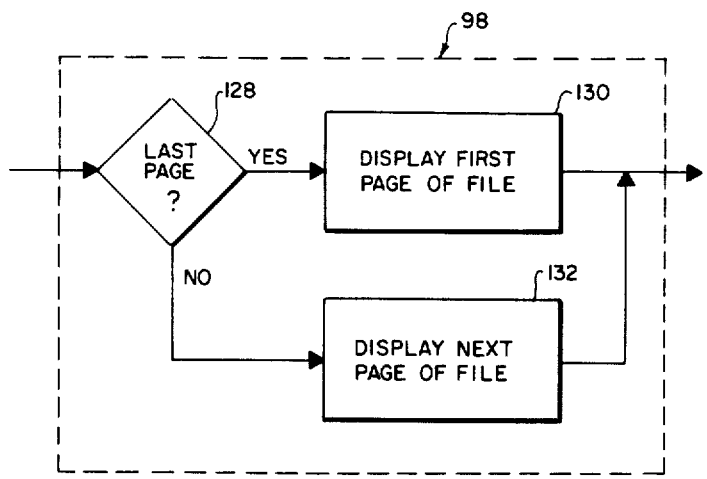
Figure 4B:
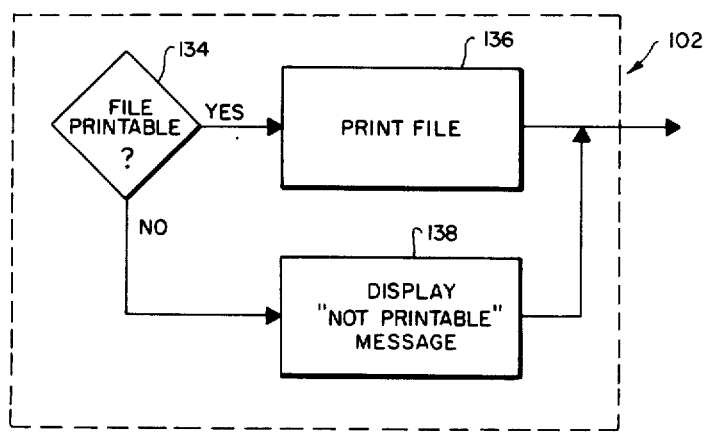

If a carriage return command is entered at step 96, the CPU calls a "carriage return" subroutine as generally designated in step 98, which may then be used to retrieve each successive page of the data file previously addressed in either step 92, step 86 or step 97. As shown in FIG. 4A, the "carriage return" subroutine requires the CPU to first determine in step 128 whether the last page of the addressed data file has been reached. If so, CPU 10 moves to step 130 and then displays the first page of the addressed data file. If the last page has not been reached, CPU 10 moves instead to step 132 and displays the next step of the file and then returns to look for another input instruction at step 94. If a carriage return instruction is not input at step 96, CPU 10 moves to step 100 where it determines whether information from the addressed data file is to be printed out at printer 16. If so, CPU 10 calls a "print" subroutine generally designated at step 102. As illustrated in FIG. 4B, the "print" subroutine 102 causes the CPU 10 to first determine whether the addressed data file is one which has been designated as being capable of being output on the printer 16. If so, CPU 10 moves from step 134 to step 136 and prints the addressed file. If the addressed file has not been designated as one which can be printed out, CPU 10 moves to step 138 and displays on the CRT screen 14 an error message indicating that the addressed file cannot be printed. CPU 10 then returns to step 94 to look for another input command.

Figure 4C:
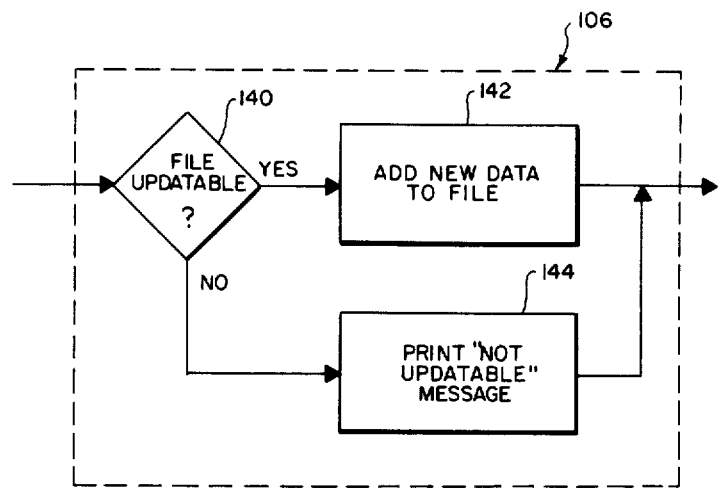

If the CPU 10 is not instructed to print any information from the addressed data file in step 100, it moves next to step 104 where it determines whether the addressed data file is to be updated. If so, CPU 10 calls the "update" subroutine as generally designated in step 106. As illustrated in FIG. 4C, the "update" subroutine 106 requires the CPU 10 to first determine in step 140 whether the addressed file is one which can be updated by the system user to include additional information. If so, the additional information is added to the data file in step 142. If not, the CPU moves to step 144 and causes an error message to be printed on the CRT screen 14. Following steps 142 or 144, CPU 10 then returns to step 94 to look for the next input command.

Figure 4D:
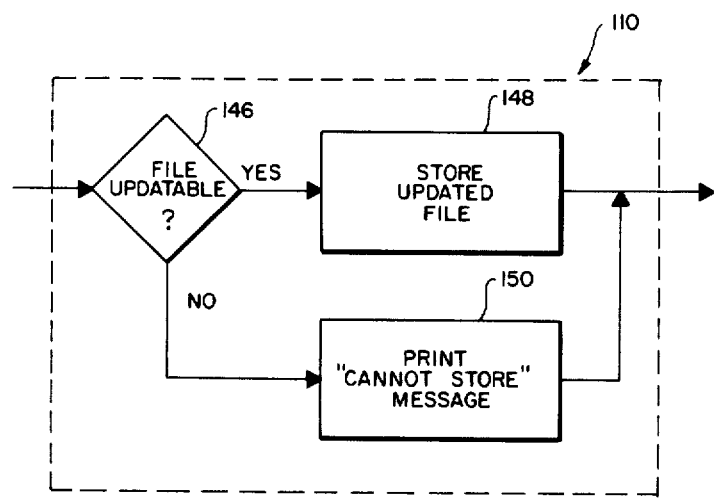

If a particular file has been updated, typically the next command which is input to the CPU is a command to store the updated file. Thus, in step 108 when the CPU is instructed to store the updated file, CPU 10 retrieves the next subroutine generally designated at step 110. As shown in FIG. 4D, in this subroutine the CPU 10 again first checks in step 146 to determine whether the particular file is one which is designated as being capable of being updated by the addition of information. If so, CPU 10 moves to step 148 and stores the updated file and then returns to look for the next command. If the file is not one which is designated to receive updated information, CPU 10 displays an appropriate error message in step 150 and then returns to step 94 to receive the next input command.

Figure 4E:
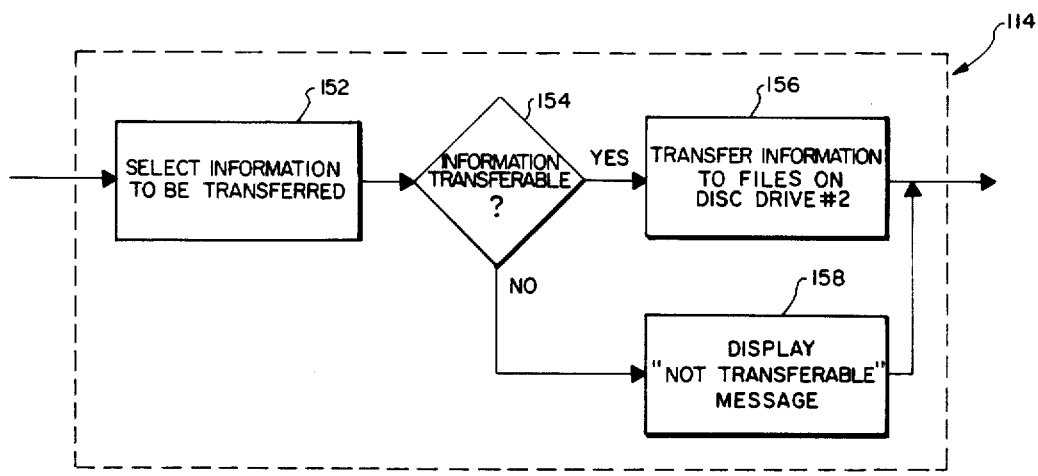

With continuing reference to FIGS. 3A-3B, after step 108 CPU 10 moves to step 112 where it determines whether any of the information which is displayed for the addressed data file is to be transferred and separately stored in one of the addressable files 44-46 (see FIG. 1) contained on the second disc drive 40. If so, CPU 10 calls a "transfer" subroutine as generally designated at step 114. As illustrated in FIG. 4E in the "transfer" subroutine CPU 10 first identifies in step 152 the information which has been selected for transfer. CPU 10 then moves to step 154 where it determines whether the information is transferable. If so, the information is then transferred to one of the data files 44-46 contained on the second disc drive 40. If not, CPU 10 causes an error message to be displayed as in step 158 on the CRT screen 14. CPU 10 then returns to step 94 to look for the next input command.

Figure 4F:
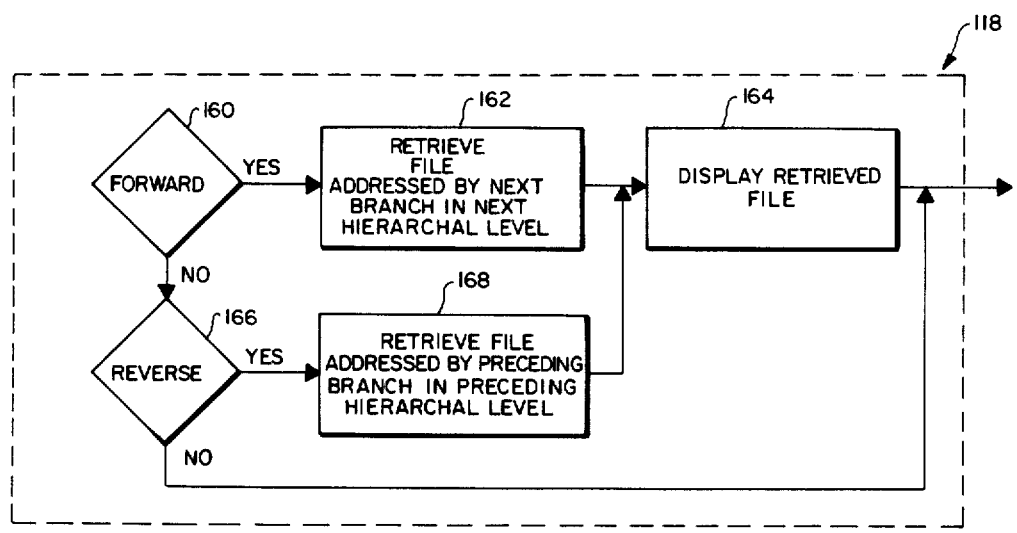

Following step 112, CPU 10 may be instructed to move forward to the next branch in the next level of the hierarchal information tree, or to reverse and move back to the last preceding branch in the hierarchal information tree. When instructed to move forward or to reverse, CPU 10 calls the "forward/reverse" ("F/R") subroutine generally designated at step 118. As illustrated in FIG. 4F, in this subroutine the CPU 10 first determines whether it has been instructed to move forward in step 160. If so, the CPU retrieves the file addressed by the next branch in the next level of the hierarchal tree. For example, with reference to FIG. 2A, if the CPU 10 had initially retrieved branch 57a addressed at "A1", and if the CPU 10 had then been instructed to move forward it would move next to branch 58a, addressed at "A1A". Following step 162, CPU then moves to step 164 and displays the first page of information in the file which has been retrieved from the next level of the hierarchal tree. CPU 10 then returns to step 94 and looks for the next input command.

If the CPU is not instructed to move forward to step 160, it then checks to determine whether it has been instructed to reverse its search and move back to the last preceding branch in the hierarchal information tree, as indicated at step 166. If so, the CPU 10 moves to step 168, retrieves the file addressed by the preceding branch in the preceding level of the tree then moves to step 164 so as to display the first page of the retrieved file. CPU 10 then again returns to step 94 to look for the next input command.

Figure 4G:
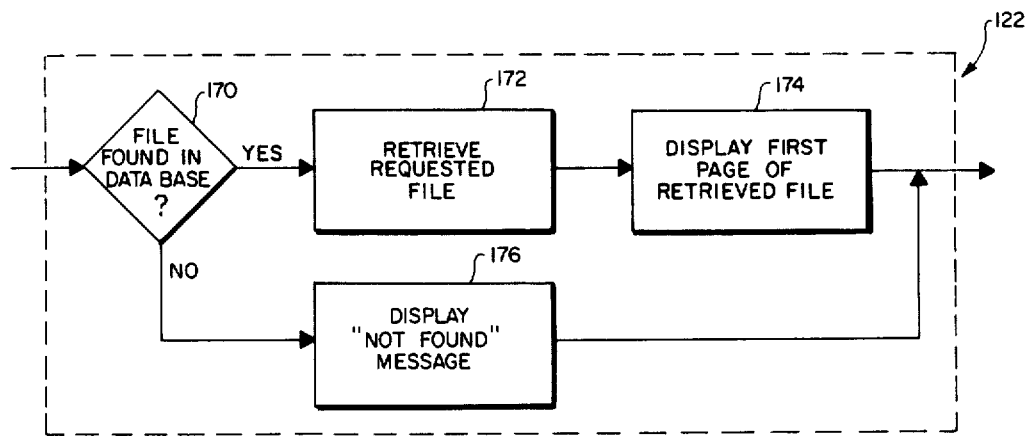

Following step 116, CPU 10 may move to step 120 to determine whether the address of any related data file has been entered. As hereinafter more fully described, the unique alphanumeric address assigned to each branch in the hierarchal information tree of the data base can be used as a means of addressing related data files so that large quantities of information relating to any of the information classified at the various branches of the hierarchal information tree can be retrieved using the same basic alphanumeric addressing scheme which is used to link the various branches of the tree. If the address of a related file is entered to the CPU at step 120, CPU 10 calls an "enter" subroutine generally designated at step 122. As illustrated in FIG. 4G, the CPU first determines in step 170 whether the related step is found in the data base. If so, the file is retrieved in step 172 and then displayed in step 174 and CPU 10 then returns to step 94 to find the next input command. If the file is not found in the data base at step 170, CPU 10 moves to step 176 and displays the appropriate error message on the CRT screen 14.

Figure 4H:
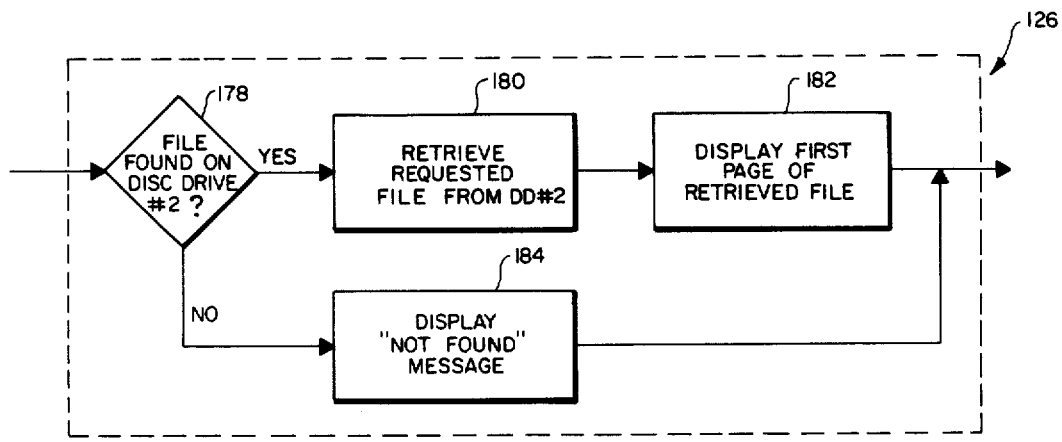

Following step 120, CPU 10 may determine in step 124 whether it has been instructed to retrieve one of the addressable files 44–46 from the second disc drive 40. If the address of one of the files containing previously retrieved information is entered in step 124, CPU 10 calls a "retrieve disc drive #2" subroutine generally designated at step 126. As shown in FIG. 4H, in this subroutine the CPU first determines in step 178 if the requested file is contained on the second disc drive 40. If so, the requested file is retrieved and then displayed in steps 180 and 182, respectively. If the requested file is not found, the CPU moves to step 184 and displays an appropriate error message on the CRT screen 14, prior to returning to step 94 to receive the next input command.

As mentioned above, the system and method of the present invention can be used in a wide variety of applications. However, by way of illustrating the utility of the general system and method described above, reference is next made to FIGS. 5–10 in connection with a description of the system and method of this invention as applied in the context of a computerized system and method which can be used as an aid in providing diagnostic information to a therapist seeking to identify and treat a particular speech disorder in a patient.

Figure 5:
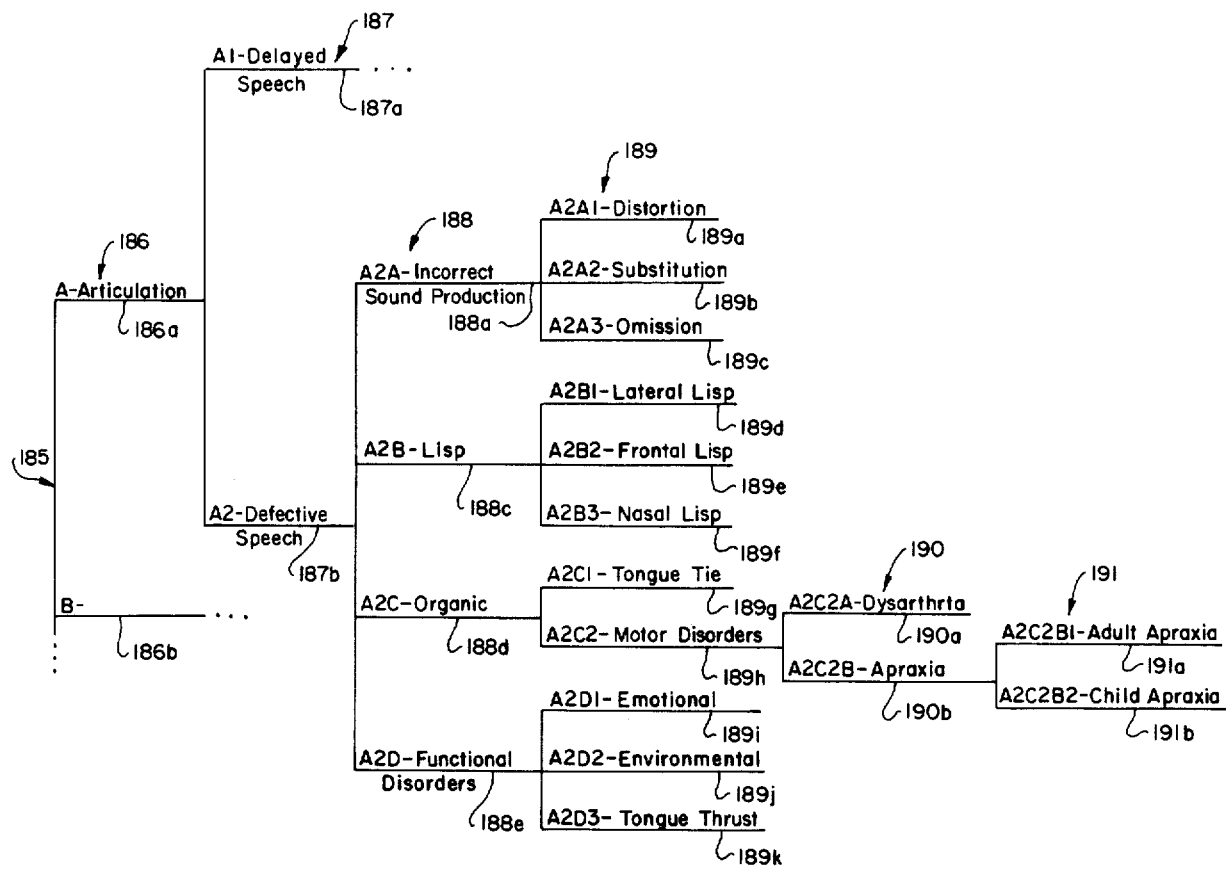
FIG. 5 is a schematic diagram which illustrates a hierarchal information tree in which various symptoms of speech disorders may be classified and linked together, and which may be used in a typical appliation of the system and method of the present invention when applied in the context of computer-aided medical diagnostics.

With reference first to FIG. 5, an expert speech therapist first prepares the hierarchal information tree 185 by identifying and classifying information which is representative of possible symptoms of a type of speech disorder. For example, an articulation problem may be further defined as involving either delayed speech or defective speech. The problem of defective speech can be further broken down as illustrated in FIG. 5. In this manner, the information which is representative of particular symptoms corresponding to different types of speech disorders is logically classified and arranged by the human expert.

In the hierarchal tree 185, six levels of information are generally illustrated at 186–191. Each level may have numerous branches. For example, in the first level 186, branches 186a–186b are shown. The second level 187 includes branches 187a–187b, and so on through each of the other levels 188–191. Each branch, such as branch 186a for articulation, branch 187a for delayed speech, branch 187b for defective speech and so on is associated with one or more data files which further define that particular problem and which also generally describe subcategories which further break down that particular type of speech disorder. Each branch and its corresponding data files are then linked together to form the hierarchal information tree by means of the unique alphanumeric addressing system previously described in connection with FIG. 2A, or other comparable addressing methods as illustrated, for example, in FIGS. 2B–2D. For example, in FIG. 5, branch 186a of the first level 188 corresponds to "articulation", which is identified by the alphanumeric address "A". The alphanumeric address "A2" identifies the attribute of "defective speech", which corresponds to branch 187b in the second level 187 of the hierarchal information tree, and so forth.

The various data files are next stored on a magnetic disc such as a floppy disc, along with the system control program previously described in connection with FIGS. 3A–3B and 4A–4H. After a therapist has met with a patient and has determined that that patient has an articulation problem, he may wish to use the system and method of the present invention to help him further identify particular symptoms which will ultimately help him to focus on what is causing the problem for his patient and how that problem can be treated.

Figure 6:
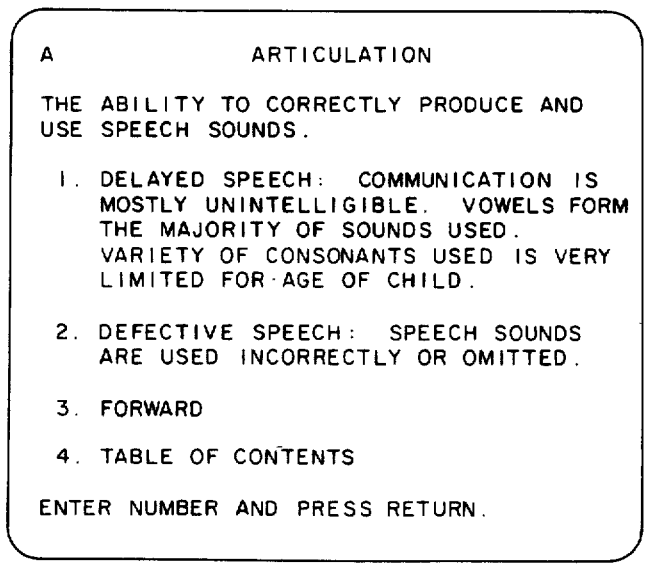

First, the disc containing the hierarchal information tree which has been compiled previously is loaded into the first disc drive 26. A second disc is loaded into disc drive 40 and the name of the patient is entered so as to establish a client file for purposes of the therapist's search. The therapist then proceeds to have the CPU 10 search through the various levels of the hierarchal information tree. For example, after the title page and, if desired, the table of contents are displayed by the CPU, the CPU next displays page one of the data base, which is illustrated in FIG. 6. As shown in FIG. 6, articulation is first generally defined and is then subdivided into two further categories, namely, delayed speech and defective speech. From this information, the therapist next determines whether his patient's problem is characterized as delayed speech or defective speech. For example, if the therapist decides that his patient has a defective speech problem, he selects and enters "B". CPU 10 then automatically translates this selection to the alphanumeric address "A2" which identifies the data file corresponding to branch 187b of the hierarchal information tree illustrated in FIG. 5. CPU 10 then retrieves the data file addressed at "A2" in the data base and displays the first page of that data file, as illustrated in FIG. 7.

As shown in FIG. 7, the "A2" data file contains a general definition describing the problem of defective speech, and then further subdivides that problem into four subcategories. Again the therapist decides which of the subcategories may characterize his patient's problem and selects, for example, subcategory "B", lisping. The CPU automatically translates this selection into the address "A2B" (see FIG. 5) of the data file corresponding to branch 188b of the hierarchal information tree. The CPU then retrieves the data file addressed at "A2B" in the data base of the first disc drive 26 (see FIG. 1) and displays the first page of that data file, which is illustrated in FIG. 8.

As shown in FIG. 8, the "A2B" data file contains a general description describing a lisp and then subdivides that problem into three subcategories. The therapist then again makes a determination and, for example, selects the category "A", lateral lisp. CPU 10 automatically translates this selection into the address "A2B1" of the data file corresponding to branch 189d and retrieves that file for display on the CRT screen, as illustrated in FIG. 9.

As shown in FIG. 9, the information contained in the data file for lateral lisp describes several symptoms. The therapist may previously have noticed that his patient has one or more of these symptoms. Or, the therapist may not be sure whether those symptoms are exhibited by his patient. If the therapist is sure that one or more of these symptoms describe the problem exhibited by his patient, he may identify that particular symptom and then transfer it to the client file contained in the second disc drive 40. This may be done by entering one of the letters A, B, or C depending upon the particular symptom, and by then entering the command "/S". CPU 10 will then transfer the information describing that particular symptom to a "symptom" file contained in the therapist's patient file of the second disc drive 40. The therapist may also wish to go back and check whether his patient exhibits one or more of the symptoms displayed in this file. If so, the therapist may identify the particular symptom which he wants to further check with his patient by again entering one of the letter A, B or C, followed by the command "/Q". This causes the information identified to be transferred to a "question" file contained on the therapist's patient disc.

The therapist may also wish to review related data files containing information about possible causes, treatment, and further resource information, as for example bibliography references, relating to the problem of lateral lisp identified by the data file "A2B1" as illustrated in FIG. 9. To retrieve these related files, the therapist may enter one of the selections 1-3 which are identified as "CAUSE ASSOC. FACT", "TREATMENT", or "BIBLIOGRAPHY". Entry of any of these numbers will cause the CPU 10 to retrieve a related data file containing the additional information. For example, if the therapist enters "1", the CPU retrieves a related file identified and addressed as "A2B1-C", as illustrated in FIG. 10. This file identifies causes and/or associated factors which may cause a lateral lisp.

As another example, if after having reviewed the information contained on the data file "A2B1" the therapist enters the number "2", CPU 10 retrieves a related data file addressed as "A2B1-T", as illustrated in FIG. 11. This related data file contains information describing recommended treatment procedures for this particular type of speech disorder.

Referring again to FIGS. 6-9, it will be seen that in addition to the other selections which can be entered, the therapist can also enter a command by entering the number "4" or the number "5" which will cause the CPU to search the hierarchal information tree 185 in either a reverse or forward mode, respectively. As described above, in the reverse mode, the CPU will retrieve the data filed corresponding to the preceding branch. For example, if the therapist were reviewing the "A2B1" data file illustrated in FIG. 9, the reverse mode would cause the CPU to retrieve the "A2B" file (see FIG. 8). Similarly, the forward mode causes the CPU to retrieve the next succeeding branch in the next level of the hierarchal tree.

Thus, in this manner the therapist uses the system and method of the present invention to help him identify information relating to symptoms which he has observed in his patient as well as factors which may cause those symptoms and recommended treatment procedures. The therapist also identifies in the course of his search other symptoms which he may need to inquire about further in subsequent visits with his patient. This information is transferred and recorded onto the patient's file on the second disc drive 40.

Since the patient's disc also contains a system control program 28, the therapist may insert the patient's disc into either of the disc drives at any time subsequent to the initial search for the purpose of updating any of the information contained on the patient's disc or for the purpose of recording the results of various treatment procedures. For example, as illustrated in FIG. 12, the patient's individual client file also contains a table of contents which identifies the symptom summary, question summary, progress summary and other files pertaining to that particular patient. Those files may be addressed and updated following further examination of the patient or further treatment, as the case may be. FIG. 13 illustrates an example of one of the testing files which may be contained on the therapist's patient disc which is identified as file "TR-A". That file contains articulation testing information which can be entered so as to describe the test results of the therapist's patient as of a particular date. Using the system control program generally described above in connection with FIGS. 3A-3B and 4A-4H, these files can be periodically updated as needed to reflect the patient's progress.

As a specific example of the control program generally described above in connection with FIGS. 3A-3B and 4A-AH, the program listing contained at Appendix A hereto is incorporated herein by reference. The listing particularly illustrates the manner in which the general principles described above may be used to program a computer system of the type described in FIG. 1 so as to be able to use the system and method generally described above to provide storage and retrieval of information which can be used for purposes of diagnosis and treatment of speech disorders in conjunction with a data base as illustrated in FIG. 5A. The program listing is written in Basic and may be used on an Apple II or other comparable type of computer.

It should of course be recognized that the invention is not intended to be limited by the program listing contained in Appendix A, which is simply an illustrative example that has been included in order to fully illustrate the utilization of the system and method of the present invention in a particular application. The invention may be embodied in other specific forms without departing from its spirit or essential characteristics and the described embodiments are thus to be considered in all respects only as illustrative and not restrictive. The scope of the invention is, therefore, indicated by the appended claims rather than by the foregoing description, and all changes which come within the meaning and range of equivalency of the claims are to be embraced within their scope.

APPENDIX A

```
]LIST
1     HOME
2     VTAB 7: HTAB 15: PRINT "CDTS MASTER"
3     VTAB 12: HTAB 12: PRINT "INSERT FILES DISK"
4     VTAB 15: HTAB 12: PRINT "THEN PRESS RETURN";
5     INPUT "";C$
10    REM A$ = FILE ARRAY
20    REM D$ = CONTROL-D
30    REM N$ = NEXT FILE
40    REM L$ = LAST FILE
50    REM C$ = CURRENT INPUT
70    ONERR GOTO 840
90    LET E$ = ".MW"
100   LET DB% = 0: REM DEBUG MODE
101   LET DS% = 0:PX% = 0:UX% = 0
102   LET ST% = 15000
110   DIM A$(201)
120   LET Z1$ = " ":Z2$ = " ":Z3$ = " "
130   LET D$ = CHR$ (4)
140   LET N$ = "START.MW"
150   LET L$ = ""
155   HIMEM: 15000
160   HOME
170   LET F$ = N$
172   IF DB% = 0 THEN 180
174   INPUT "FILENAME? ";C$
176   IF C$ "" THEN F$ = C$
180   LET D$ = CHR$ (4)
190   REM
200   REM ** LOAD DATA FILE **
210   REM
215   PRINT
220   PRINT D$;"BLOAD";F$;",A"; ST%
240   LET XX% = ST% + 255
250   FOR J = 1 TO 201
260   LET X$ = ""
270   FOR I = 1 To 40
280   LET XX% = XX% + 1
290   LET C% = PEEK (XX%)
300   IF C% 140 THEN C% = C% - 128
320   IF C% = 13 GOTO 350
330   LET X$ = X$ + CHR$ (C%)
340   NEXT I
350   LET A$(J) = X$
360   IF LEFT$ (X$,3) = "%%%" GOTO 390
370   PRINT "*";
380   NEXT J
390   PRINT
395   PRINT D$; "CLOSE";N$
400   REM
410   REM ** PRINT OUT SCREENS **
420   REM
430   FOR J = 1 TO 9
440   HOME
445   IF PX% = 1 THEN X$ = A$((J * 20) + 1):
      PRINT TAB( 39);X$
450   FOR I = 1 TO 20
460   LET X$ = A$((J * 20) + I)
462   IF LEFT$ (X$,3) = "%%%" THEN
      PRINT D$;"PR# 0": GOTO 560
465   IF PX% = 0 THEN 480
466   LET LL% = LEN (X$)
467   IF LEFT$ (X$,1) = "/" THEN 490
470   IF LEFT$ (X$,1) = " " THEN
      X$ = " " + RIGHT$ (X$,LL% - 1)
472   IF MID$ (X$,39,1) = " " THEN
      X$ = LEFT$ (X$,38) + " "
480   IF LEFT$ (X$,1) = " " THEN
      X$ = ""
482   PRINT X$
```

APPENDIX A-continued

```
]LIST
490   NEXT I
492   PRINT D$;"PR# 0"
493   LET PX% = 0
510   VTAB 23: HTAB 1: INPUT "";C$
520   IF C$ "" THEN 570
530   NEXT J
540   GOTO 570
560   IF 1 1 THEN VTAB 23: HTAB 1:
      PRINT TAB(39);: VTAB 23:
      HTAB 1: INPUT "";C$
570   IF C$ = "" GOTO 430
590   If C$ = "/TRACE" THEN TRACE
      :I = 99: GOTO 560
600   IF C$ = "/NOTRACE" THEN NOTRACE
      :I = 99: GOTO 560
610   IF LEFT$ (C$,8) = "QUESTION"
      THEN N$ = "QUESTIONS": GOTO 2000
615   IF LEFT$ (C$,7) = "SYMPTOM"
      THEN N$ = "SYMPTOMS": GOTO 2000
622   IF LEFT$ (C$,2) = "/P" THEN 890:
      REM PRINT
624   IF LEFT$ (C$,2) = "/F" THEN
      GOSUB 950: GOTO 560: REM FILE
626   IF C$ = "/U" THEN GOSUB 600 0:
      GOTO 440: REM UPDATE
628   IF LEFT$ (C$,2) = "/Q" THEN
      GOSUB 5000:I = 99: GOTO 560
629   IF LEFT$ (C$,2) = "/S" THEN
      GOSUB 5000:I = 99: GOTO 560
630   LET C% = VAL (C$)
640   IF C% 1 GOTO 700
650   IF C% 9 GOTO 700
680   LET N$ = A$(C%)
690   GOTO 730
700   REM
710   IF C$ "" THEN N$ = C$
730   LET L$ = F$
740   IF L$ = N$ OR N$ = "" THEN 400
750   IF N$ = ".EX" THEN END
760   IF RIGHT$ (N$,3) ".MW"
      THEN N$ = N$ + E$
770   GOTO 160
780   REM
790   VTAB 22: HTAB 1: PRINT "* ";
      F$;" NOT FOUND - CHECK INDEX #"
791   VTAB 23: HTAB 1: PRINT "* RE ENTER -";
810   INPUT "";C$
820   GOTO 570
840   LET E = PEEK (222)
850   IF E = 5 THEN 390
860   IF E = 6 THEN 780
870   VTAB 22: HTAB 1: PRINT "ERROR CODE = ";E
872   VTAB 23: HTAB 1: PRINT "PRESS
      RETURN TO CONTINUE";
874   INPUT "";C$
876   GOTO 570
890   REM
900   REM ** PRINT OUT SCREEN **
910   REM
920   IF A$(20) "NOPRINT" THEN
      PX% = 1: PRINT D$;"PR# 1": GOTO 445
930   VTAB 23: HTAB 1: PRINT
      "** CANNOT PRINT THIS SCREEN **";
940   GOTO 510
950   REM
960   REM ** FILE UPDATED DATA **
970   REM
972   IF LEFT$ (A$(17),3) = "UPD"
      THEN 980
974   VTAB 23: HTAB 1: PRINT "** NOT
      UPDATEABLE - CANNOT SAVE**";
978   RETURN
980   VTAB 23: HTAB 1: PRINT"
      ** ITEM FILED **";
990   LET XX% = ST% + 255
      FOR J = 1 TO 201
1000  FOR J = 1 TO 201
1010  VTAB 23: HTAB 1: INVERSE :
      PRINT J;: NORMAL
1020  LET X$ = A$(J)
1030  IF LEFT$ (X$,3) = "%%%" THEN 1114
```

APPENDIX A-continued

]LIST

```
1040  LET JJ% = LEN (X$)
1042  IF JJ% = 0 THEN 1090
1050  FOR I = 1 TO JJ%
1060  LET XX% = XX% + 1
1064  LET B% = ASC ( MID$ (X$,I,1))
1070  POKE XX%,B%
1080  NEXT I
1090  LET XX% = XX% + 1
1100  POKE XX%,13
1110  NEXT J
1114  LET B% = VAL ("%")
1120  FOR J = 1 TO 3
1130  LET XX% = XX% + 1
1140  POKE XX,B%
1150  NEXT J
1160  LET XY% = XX% - ST%
1170  PRINT ""
1173  LET FX$ = F$
1175  IF MID$ (C$,3,LEN (C$) - 2)
      "" THEN FX$ = MID$
      (C$,3, LEN (C$) - 2)
1177  IF RIGHT$ (FX$,3) ".MW"
      THEN FX$ = FX$ + ".MW"
1180  PRINT D$;"BSAVE ";FX$;", A";ST%;",
      L",XY%
1190  RETURN
2000  REM
2010  REM --------
2020  REM READ IN TEXT FILES
2025  HOME
2030  PRINT D$;"OPEN ";N$
2040  PRINT D$;"READ ";N$
2045  FOR I = 1 TO 25:A$(I) = "":NEXT I
2047  LET A$(21) = "" + N$
2050  FOR J = 23 TO 201
2055  LET A$(J) = "%%%"
2060  INPUT X$
2063  LET LL$ = LEN (X$)
2065  IF LEFT$ (X$,1) = " "
      THEN X$ = "+" + RIGHT$ (X$,LL% - 1)
2070  LET A$(J) = X$
2080  NEXT J
2090  GOTO 390
5000  REM
5010  REM --------
5020  REM SAVE LINE IN QUESTION FILE
5030  IF LEFT$ (A$(19),4) = "NOT E" THEN 5060
5040  VTAB 23: HTAB 1: PRINT "** CANNOT
      MAKE NOTE**";
5050  RETURN
5060  IF LEFT$ (C$,2) = "/S"
      THEN FX$ = "SYMPTOMS"
5065  IF LEFT$ (C$,2) = "/Q" THEN FX$ =
      "QUESTIONS"
5070  VTAB 23: HTAB 1: PRINT"
      ** NOTING ";FX$; "**"
5074  LET B$ = MID$ (C$,3,1) + "."
5080  FOR L = 1 TO 20
5090  IF MID$ (A$((J * 20) + L),2,2)
      = B$ THEN 5150
5100  NEXT L
5110  VTAB 23: HTAB 1: PRINT "** ";B$;" NOT
      FOUND TO NOTE**";
5120  INPUT "";C$
5140  RETURN
5150  REM
5160  REM ** FOUND STUFF TO
      NOTE **
5170  VTAB 23: HTAB 1: PRINT "** ";B$;" FOUND
      AND NOTED **";
5175  VTAB 22: HTAB 1: PRINT ""
5177  PRINT D$;"OPEN ";FX$
5178  PRINT D$;"CLOSE ";FX$
5180  PRINT D$;"APPEND ";FX$
5190  PRINT D$;"WRITE ";FX$
5192  PRINT A$((J * 20) + L)
5193  LET L = L + 1
5194  FOR M = L TO 20
5196  LET X$ = A$((J * 20) + M)
5198  IF MID$ (X$,2,1)
      THEN 5210
5200  IF MID$ (X$,5,1) = " "
      THEN 5210
5202  PRINT X$
5204  NEXT M
5210  PRINT D$;"CLOSE ";FX$
5280  VTAB 23: HTAB 1: PRINT TAB(38);
5290  RETURN
6000  REM
6010  REM --------
6020  REM FIND THE BREAK POINTS
6021  LET UX% = 0
6022  IF MID$ (A$(17),1,3) =
      "UPD" THEN 6028
6024  VTAB 23: HTAB 1: PRINT "**CANNOT
      UPDATE **";
6026  INPUT "";C$
6027  RETURN
6028  VTAB 23: HTAB 1: PRINT"
      ** ENTERING UPDATE MODE **";
6029  FOR M = 1 TO 20
6030  LET MM% = (J * 20) + M
6040  LET LL% = LEN (A$(MM%))
6050  FOR L = 1 TO LL%
6060  LET B$ = RIGHT$ ( LEFT$
      (A$(MM%),L),1)
6070  IF B$ = Z3$ THEN 6110
6080  IF B$ = Z1$ THEN Z8 = L + 1
6090  IF B$ = Z2$ THEN Z9 = L - 1:
      GOSUB 6150: IF UX% = 1 THEN 6114
6100  NEXT L
6110  NEXT M
6114  VTAB 23: HTAB 1: PRINT TAB(39);
6120  RETURN : REM DONE GOBACK
6130  REM
6140  REM
6150  REM --------
6160  REM GET THIS INPUT
6165  LET BB$ = ""
6170  FOR N = Z8 TO Z9
6175  LET B$ = MID$ (A$(MM%),N,1)
6180  HTAB N: VTAB M
6190  GET I$
6200  IF I$ = CHR$ (08) THEN GOSUB 6330:N
      = N - 1: GOTO 6250: REM BACKUP
6210  IF I$ = CHR$ (13) THEN GOSUB 6420:
      GOTO 6250: REM RETURNS
6220  IF I$ = CHR$ (21) THEN I$ = B$:
      GOTO 6230: REM FORWARD
6225  IF I$ = "@" THEN UX% = 1: RETURN
6230  PRINT I$;
6240  LET BB$ = BB$ + I$
6250  NEXT N
6260  LET L$ = LEFT$ (A$(MM%),Z8 - 1)
6270  LET R$ = RIGHT$ (A$(MM%), LEN
      (A$(MM%)) - Z9)
6280  LET A$(MM%) = L$ + BB$ + R$
6290  LET BB$ = ""
6300  RETURN
6310  REM
6320  REM
6330  REM --------
6340  REM HANDLE BACKUPS
6350  IF N = Z8 THEN RETURN
6360  PRINT B$;
6370  LET Y = LEN (BB$) - 1
6380  IF Y 1 THEN BB$ = "":N = N - 1: RETURN
6390  LET BB$ = LEFT$ (BB$,Y): N = N - 1: RETURN
6400  REM
6410  REM
6420  REM --------
6430  REM HANDLE RETURNS
6440  LET I$ = MID$ (A$(MM%),N,(Z9 - N + 1))
6450  LET BB$ = BB$ + I$
6460  LET N = Z9
6470  RETURN
```

What is claimed and desired to be secured by U.S. Letters Patent is:

1. In a computer system having a CPU, input/output apparatus electronically coupled to said CPU, and a storage means electronically coupled to said CPU, a method of information storage and retrieval comprising the steps of:
   (a) logically classifying a plurality of data files and arranging said data files in the form of a hierarchal information tree having a plurality of mutually exclusive branches corresponding to the data files classified at various levels in the hierarchal structure of said tree;
   (b) assigning a unique alphanumeric address to each said mutually exclusive branch of said hierarchal information tree, each said address identifying a data file so as to link said data files together to form an expandable hierarchal tree in which the data files corresponding to each mutually exclusive branch are generally addressed as follows:

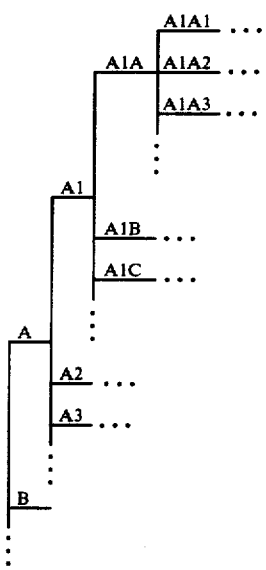

(c) storing said logically classified data files on said storage means;
   (d) initializing said CPU at said input/output apparatus;
   (e) said CPU retrieving from said storage means the data file corresponding to the first branch of the first level in the hierarchal structure of said tree;
   (f) said CPU thereafter selecting another data file from the information contained in the data file retrieved by said CPU in step (e);
   (g) said CPU translating said selection into the unique alphanumeric address of the corresponding branch in the next level of said tree;
   (h) said CPU retrieving from said storage means the data file identified by the unique alphanumeric address identified in step (g); and
   (i) said CPU outputting at said input/output apparatus at least a portion of the information contained in said data file retrieved in step (h).

2. A method as defined in claim 1 wherein said computer system comprises first and second storage means electronically coupled to said CPU, and wherein said method further comprises the steps of:
   (j) inputting through said input/output apparatus one or more commands to said CPU so as to select information from the data file retrieved in step (h); and
   (k) storing the information selected in step (j) on said second storage means.

3. A method as defined in claim 2 further comprising the step of:
   (l) outputting at said input/output apparatus a portion of the information stored on said second storage means.

4. A method as defined in claim 1 wherein said data base is expanded by adding additional data files to said storage means, at least one such additional data file being addressed by a new branch added to an existing level in the hierarchal structure of said tree.

5. A method as defined in claim 1 wherein said data base is expanded by adding additional data files to said storage means, at least one such additional data file being addressed by a new branch in a new level added to the hierarchal structure of said tree.

6. In a computer system comprising:
   a CPU;
   first and second programmed storage means electronically coupled to said CPU;
   an input/output apparatus comprising a keyboard, a CRT screen and a printer electronically coupled to said CPU; and
   a data base stored on said first storage means, said data base comprising a plurality of data files logically classified and arranged in the form of a hierarchal information tree having a plurality of mutually exclusive branches corresponding to the data files classified at various levels in the hierarchal structure of said tree, each said branch having a unique alphanumeric address which identifies a data file stored on said first storage means and which is generally determined as follows:

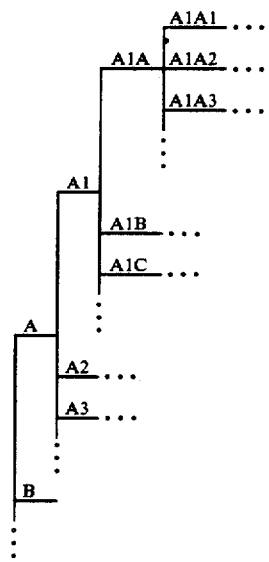

a method of information storage and retrieval comprising the steps of:
   (a) initializing said CPU at said input/output device by loading said logically classified data files and a program incorporating said method on said first storage means into said CPU;

(b) generating at said CRT screen a display of the data file corresponding to the first branch of the first level in the hierarchal structure of said tree;

(c) inputting to said CPU through said keyboard at least one selection from the information contained in the data file displayed in step (b);

(d) translating said selection input to said CPU into the unique alphanumeric address of the corresponding branch for another data file corresponding to said selection;

(e) retrieving from said first storage means the data file identified by the unique alphanumeric address determined in step (d);

(f) displaying on said CRT screen the data file retrieved in step (e);

(g) inputting through said keyboard one or more commands to said CPU so as to select information from the data file displayed in step (f);

(h) transferring the information selected in step (g) to said second storage means;

(i) initializing said CPU at said input/output device by loading said second programmed storage means into said CPU; and (j) outputting at said printer a written description of at least a portion of the information transferred to said second storage means in step (h).

7. A method as defined in claim 6 wherein said data base is expanded by adding additional data files to said first storage means, at least one such additional data file being addressed by a new branch added to an existing level in the hierarchal structure of said tree.

8. A method as defined in claim 6 wherein said data base is expanded by adding additional data files to said first storage means, at least one such additional data file being addressed by a new branch in a new level added to the hierarchal structure of said tree.

9. A method as defined in claim 6 wherein said step (c) comprises the step of selecting and inputting to said CPU a forward mode command so as to cause said CPU to translate in said step (d) said forward mode command into the unique alphanumeric address of the data file corresponding to the first branch in the next succeeding level of the hierarchal structure of said tree.

10. A method as defined in claim 6 wherein said step (c) comprises the step of selecting and inputting to said CPU a reverse mode command so as to cause said CPU in said step (d) to translate said reverse mode command into the unique alphanumeric address of the data file corresponding to the preceding branch in the preceding level of the hierarchal structure of said tree.

11. A method as defined in claim 6 wherein said step (c) comprises the step of selecting and inputting to said CPU information which identifies one or more related data files so as to cause said CPU in said step (d) to translate said information input to said CPU into the unique alphanumeric address of each said selected related data file.

* * * * *